US009760673B2

(12) United States Patent
Hunt-Schroeder et al.

(10) Patent No.: US 9,760,673 B2
(45) Date of Patent: Sep. 12, 2017

(54) APPLICATION SPECIFIC INTEGRATED CIRCUIT (ASIC) TEST SCREENS AND SELECTION OF SUCH SCREENS

(71) Applicant: GLOBALFOUNDRIES INC., Grand Cayman (KY)

(72) Inventors: Eric D. Hunt-Schroeder, South Burlington, VT (US); John R. Goss, Saint Albans, VT (US); Igor Arsovski, Williston, VT (US); Paul J. Grzymkowski, Montpelier, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 3 days.

(21) Appl. No.: 15/012,331

(22) Filed: Feb. 1, 2016

(65) Prior Publication Data
US 2017/0220727 A1 Aug. 3, 2017

(51) Int. Cl.
*G06F 17/50* (2006.01)

(52) U.S. Cl.
CPC ...... *G06F 17/5081* (2013.01); *G06F 2217/64* (2013.01)

(58) Field of Classification Search
CPC .................. G06F 17/5045; G06F 17/5081
USPC .................. 716/100, 110, 111, 112
See application file for complete search history.

(56) References Cited

U.S. PATENT DOCUMENTS

| | | | | |
|---|---|---|---|---|
| 6,404,911 B2* | 6/2002 | Ishihara et al. | ........ | G01N 21/88 257/E21.525 |
| 6,459,292 B1* | 10/2002 | Oikawa et al. | ........ | G11C 29/44 324/762.01 |
| 6,717,431 B2* | 4/2004 | Rathei et al. | ........... | H01L 22/20 257/E21.525 |
| 7,212,988 B1* | 5/2007 | Feldten | .................. | G06Q 30/02 705/7.32 |
| 7,506,225 B2* | 3/2009 | Gerowitz et al. | ...... | G11C 29/32 714/718 |
| 9,455,021 B2* | 9/2016 | Deng et al. | ............. | G11C 29/50 |
| 2006/0277201 A1* | 12/2006 | Dorsett | ................. | G06F 19/702 |

* cited by examiner

*Primary Examiner* — Sun Lin
(74) *Attorney, Agent, or Firm* — Michael LeStrange; Hoffman Warnick LLC

(57) ABSTRACT

Various embodiments include approaches for analyzing a customer design for an application specific integrated circuit (ASIC). In some cases, an approach includes: determining performance requirements of the customer design; querying a test screen database for the performance requirements of the customer design, the test screen database having failure thresholds and associated test screens for detecting the failure thresholds for a set of ASIC devices; generating a filter database including select failure thresholds and associated test screens for the performance requirements of the customer design; and selecting a set of test screens from the filter database based upon a yield cost criteria in forming the ASIC.

20 Claims, 3 Drawing Sheets

APPLICATION SPECIFIC INTEGRATED CIRCUIT (ASIC) TEST SCREENS AND SELECTION OF SUCH SCREENS

FIELD

The subject matter disclosed herein relates to integrated circuits. More particularly, the subject matter disclosed herein relates to application specific integrated circuit (ASIC) devices.

BACKGROUND

Conventional application specific integrated circuits (ASICs) are developed to meet a predetermined customer application specification (e.g., in terms of process, voltage and/or temperature), which bounds all customers to application voltages. In order to screen these ASICs for faults (e.g., SPQL, or fraction of faulty (time zero) chips in a batch) or operating life (e.g., high-temperature operating life (HTOL)) failures within this large spectrum of application voltages, aggressive screens are used which discard many chips that would have functioned for a particular customer specification. This can be especially true for memory devices, which have a particular sensitivity to differences between peripheral power supply (VDD) and cell power supply (VCS).

BRIEF DESCRIPTION

Various embodiments of the disclosure include approaches for analyzing a customer design for an application specific integrated circuit (ASIC). In some cases, an approach includes: determining performance requirements of the customer design; querying a test screen database for the performance requirements of the customer design, the test screen database having failure thresholds and associated test screens for detecting the failure thresholds for a set of ASIC devices; generating a filter database including select failure thresholds and associated test screens for the performance requirements of the customer design; and selecting a set of test screens from the filter database based upon a yield cost criteria in forming the ASIC.

A first aspect of the disclosure includes a system having: at least one computing device configured to analyze a customer design for an application specific integrated circuit (ASIC) by performing actions including: determining performance requirements of the customer design; querying a test screen database for the performance requirements of the customer design, the test screen database having failure thresholds and associated test screens for detecting the failure thresholds for a set of ASIC devices; generating a filter database including select failure thresholds and associated test screens for the performance requirements of the customer design; and selecting a set of test screens from the filter database based upon a yield cost criteria in forming the ASIC.

A second aspect of the disclosure includes a computer program product having program code stored on a computer-readable storage medium, which when executed by at least one computing device, causes the at least one computing device to analyze a customer design for an application specific integrated circuit (ASIC) by performing actions including: determining performance requirements of the customer design; querying a test screen database for the performance requirements of the customer design, the test screen database having failure thresholds and associated test screens for detecting the failure thresholds for a set of ASIC devices; generating a filter database including select failure thresholds and associated test screens for the performance requirements of the customer design; and selecting a set of test screens from the filter database based upon a yield cost criteria in forming the ASIC.

A third aspect of the disclosure includes a computer-implemented method of analyzing a customer design for an application specific integrated circuit (ASIC), performed on at least one computing device, the method including: determining performance requirements of the customer design; querying a test screen database for the performance requirements of the customer design, the test screen database having failure thresholds and associated test screens for detecting the failure thresholds for a set of ASIC devices; generating a filter database including select failure thresholds and associated test screens for the performance requirements of the customer design; and selecting a set of test screens from the filter database based upon a yield cost criteria in forming the ASIC.

BRIEF DESCRIPTION OF THE FIGURES

These and other features of this invention will be more readily understood from the following detailed description of the various aspects of the invention taken in conjunction with the accompanying drawings that depict various embodiments of the invention, in which.

Figure 1:
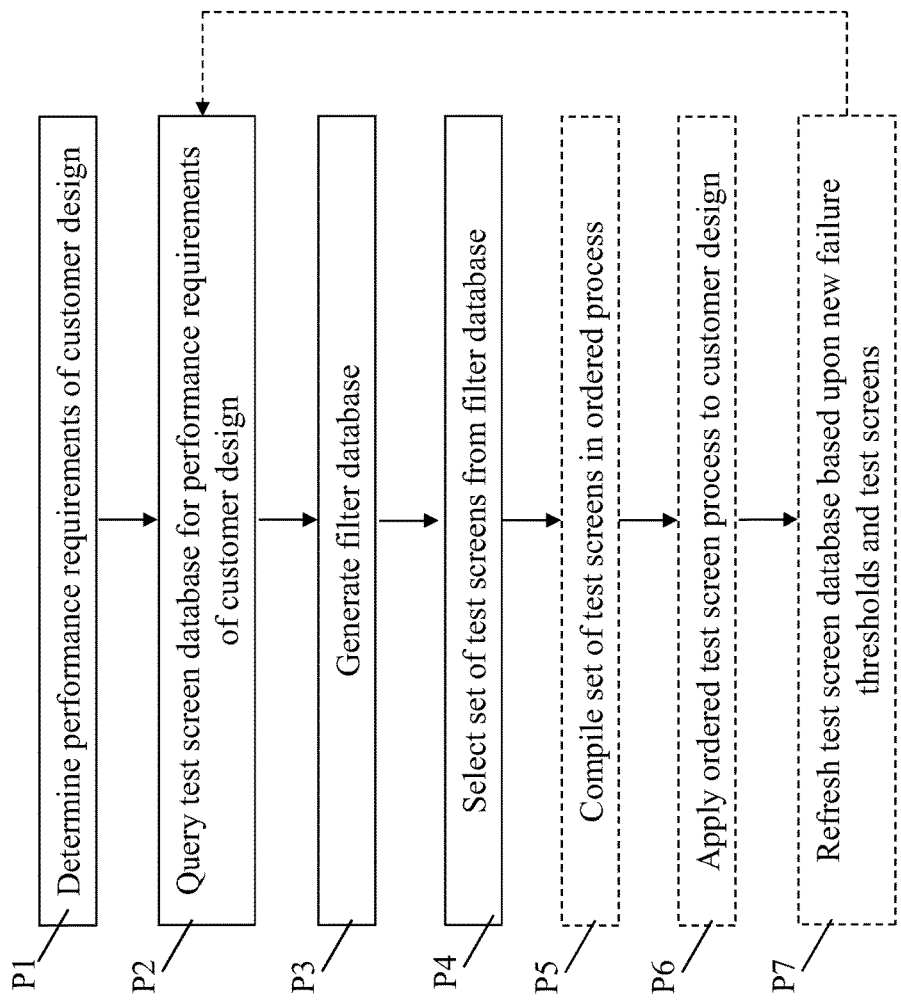
FIG. 1 shows a flow diagram illustrating a method performed according to various embodiments of the disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As indicated above, the subject matter disclosed herein relates to integrated circuits (ICs). More particularly, the subject matter disclosed herein relates to application specific integrated circuits (ASICs).

As noted herein, screening ASICs for faults (e.g., SPQL, or fraction of faulty (time zero) chips in a batch) or operating life failures (e.g., high-temperature operating life (HTOL)) within a large spectrum of application voltages conventionally involves using aggressive screens which discard many chips that would have functioned for a particular customer specification. As such, fully operable chips that would have functioned for a particular customer specification are wasted. In contrast to conventional approaches, various aspects of the disclosure include systems, computer program products and associated methods for analyzing a customer design for an ASIC. These processes can include determining performance requirements of the customer design, querying a test screen database using those performance requirements to determine failure thresholds and associated test screens for ASIC devices, and generating a filter database having select failure thresholds and associated test screens for the customer ASIC design. The processes can further include using yield criteria and cost to select a set of test screens from the filter database for the particular ASIC customer design.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

Figure 2:
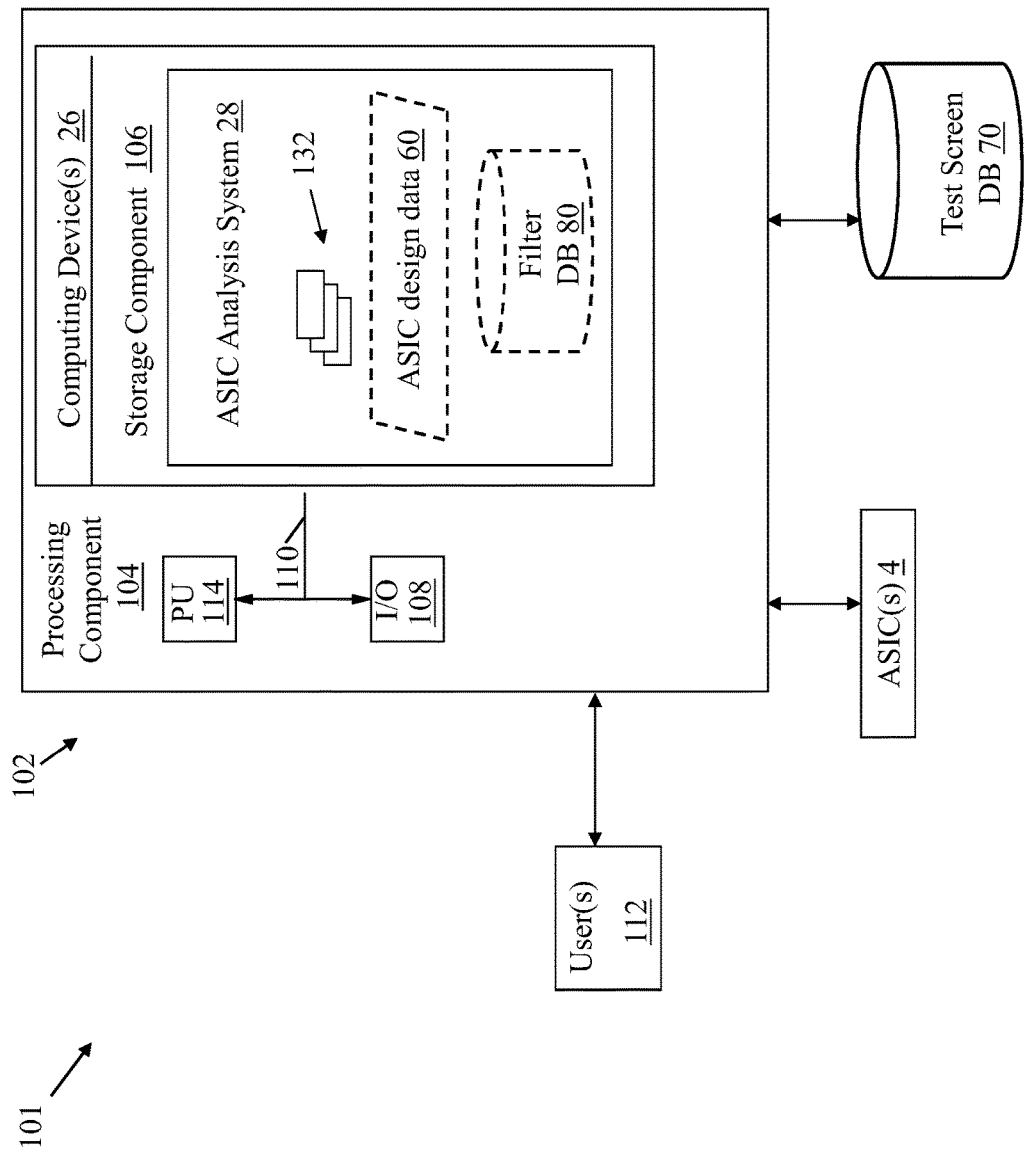
FIG. 2 shows an environment including a system for analyzing an application specific integrated circuit, according to various embodiments of the disclosure.
Figure 3:
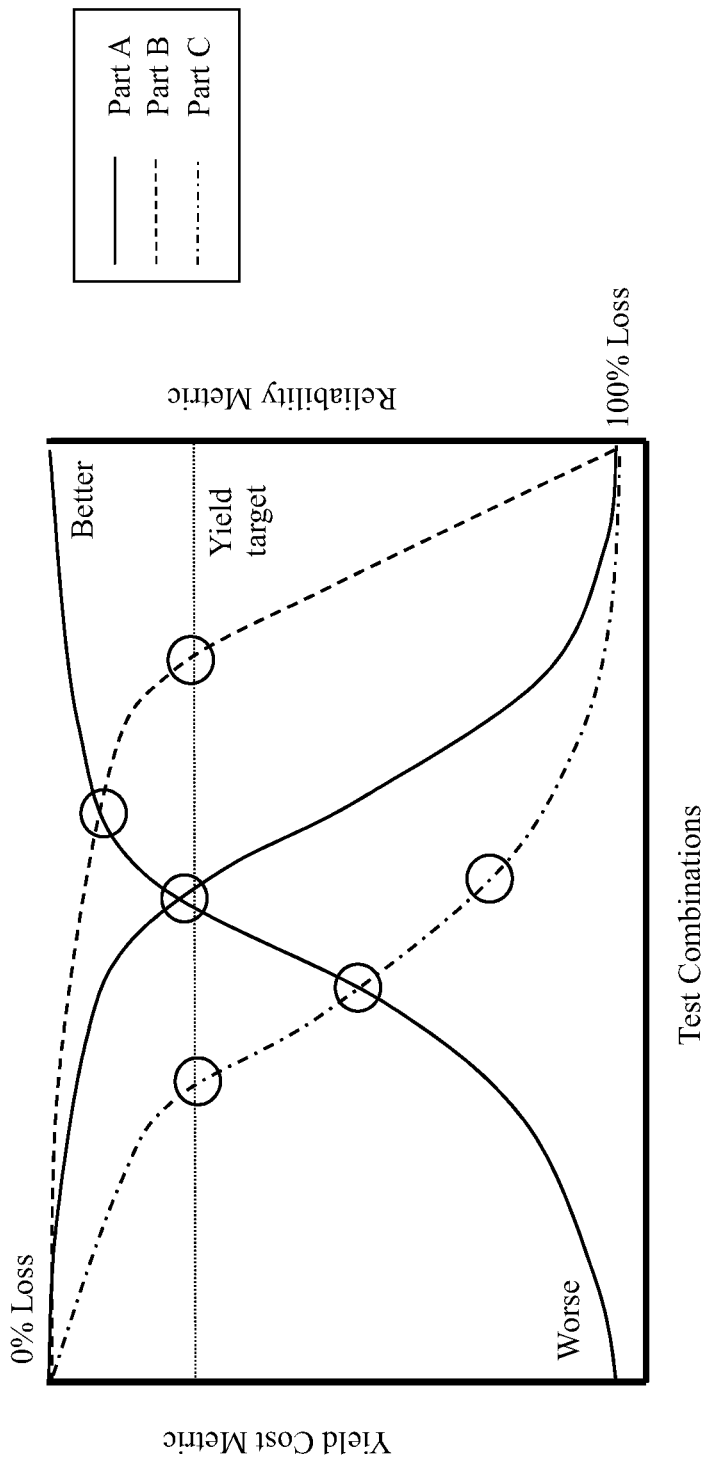
FIG. 3 shows an example Yield Cost/Reliability Metric graph, which depicts two distinct example yield cost scenarios against the same reliability metric.

FIG. 1 shows a flow diagram illustrating processes according to various embodiments of the disclosure. An application specific integrated circuit (ASIC) analysis system 28 (FIG. 2) can perform various processes as described herein to analyze a customer design (or, layout) for an ASIC (shown as ASIC design data 60, FIG. 2). These processes are described in conjunction with ASIC analysis system 28 and related data. Turning to FIG. 1, processes according to various embodiments can include:

Process P1: determining performance requirements of the customer design (ASIC design data 60). This process can include obtaining design data about a customer's ASIC 4 (FIG. 2), including data about performance requirements of that ASIC design. As shown in FIG. 2, a design of an ASIC can be represented by ASIC design data 60, which includes information about characteristics of components (e.g., vias, diodes, interconnects, lines, spacings, etc.) and relationships between components within a physical ASIC device (or simply, ASIC 4) (e.g., a memory device, transistor, etc.). It is understood that ASIC 4 can represent any of a number of ASIC devices, and that reference to a single ASIC is intended merely for simplicity of explanation. ASIC design data 60 can indicate any number of performance parameters (requirements) about the ASIC 4, e.g., at least one of a processing speed (e.g., switching speed) of the ASIC 4, a voltage of the ASIC 4 or an operating temperature of the ASIC 4. ASIC design data 60 can also include information about physical relationships of components in ASIC 4, e.g., a number of levels within ASIC 4; thicknesses, positions, lengths, etc., of lines, vias, interconnects, gate regions, etc. within one or more levels of ASIC 4; material types of one or more components within ASIC 4; etc;

Process P2: querying a test screen database 70 (FIG. 2) for the performance requirements of the customer design (ASIC design data 60). According to various embodiments, test screen database 70 includes failure thresholds, and associated test screens for detecting those failure thresholds, for a set of ASIC devices. In various embodiments, the failure thresholds stored in test screen database 70 indicate an acceptable percentage of ASIC devices formed according to the customer design (ASIC design data 60) that will fail due to a time zero failure (e.g., open circuit failure) or an operating life failure (e.g., a current leakage failure). The test screens for detecting these failures could include test screens which define relationships between characteristics of ASIC devices and particular failures, e.g., a line formed of X material, with a line length greater than Y causes, an operating life failure (e.g., a current leakage failure) in Z percent of known cases;

Process P3: generating a filter database 80 (FIG. 2) including select failure thresholds and associated test screens for the performance requirements of the customer design (ASIC design data 60). This process can include copying (or removing) select test screens from test screen DB 70 which are applicable to ASIC design data 60, and placing those select test screens in filter database (DB) 80. For example, where the customer design (ASIC design data 60) includes one or more failure thresholds related to operating life failure, this process can include copying one or more test screens which filter for indicators of operating life failure, e.g., test screens which filter characteristics such as line length and/or line length of particular material type. This process can be performed iteratively for each failure threshold/test screen coupling, amassing filter database 80 with a set of test screens for particular customer design(s) (ASIC design data 60). In various embodiments, particular cells in test screen database 70 can be mapped or otherwise copied to filter database 80, such that subsequently updating filter DB 70 automatically populates refined filter DB 80; and Process P4: selecting a set of test screens from refined filter DB 80 based upon a yield cost criteria in forming ASIC 4. For example, this process, which can be performed for each possible test combination, can include multiplying catch (filter) test yields for each of a set of (actual or simulated) ASIC devices formed according to ASIC design data 60). Continuing with this example: three catch (filter) tests yielding 100% (1.0), 90% (0.9) and 80% (0.8), when multiplied together, yield approximately 72% (0.72). The yield cost is the difference between 100% and the calculated yield, in this case, 28% (0.28). This example assumes that all yield calculations are performed on accurate samples, and that each catch (filter) test does not fail the same part (component) of the ASIC 4 (as repetitive failure could indicate a more significant issue with ASIC design data 60). In some cases, the test yields may be modified according to test time required for particular components in ASIC 4. Following determination of yield, a reliability metric may be calculated, for example, using the customer specific failure thresholds from ASIC design data 60, and determining what percentage of failures are caught by the combination of yield tests. FIG. 3 shows an example Yield Cost/Reliability Metric graph, which depicts two distinct example yield cost scenarios against the same reliability metric. This Yield Cost/Reliability Metric graph shows three distinct scenarios:

Scenario A: yield v. reliability point is just above a predetermined yield cost target. In this case, it would be desirable to choose the test(s) that optimize yield and reliability;

Scenario B: high reliability is achieved with additional space remaining in the yield budget. In this case, improved yield or improved reliability could be chosen based upon customer needs; and Scenario C: optimal yield v. reliability is not achievable without dropping below the yield target. In this case, which should not occur if test selection was successful, one is forced to choose between better yield with worse reliability, better reliability with worse yield, or some option between the two;

Returning to FIG. 1, according to various embodiments, the above-noted process can further include an additional sub-process:

Process P5 (performed in various embodiments): compile the set of test screens in an ordered test screen process. This can include compiling the set of test screens in the refined filter DB 80 in an efficient process flow. For example, this could include ordering test screens for the ASIC design data 60 that would progressively filter narrower subsets of the ASIC design data 60, thereby streamlining the process of analyzing that data;

Process P6 (performed in various embodiments): apply the ordered test screen process to the customer design for the ASIC (ASIC design data 60). This process can include running ASIC design data 60 through the ordered test screen in refined filter DB 80 to determine whether the ASIC 4 is likely to meet customer requirements; and Process P7 (performed in various embodiments): refresh filter DB 80 based upon new failure thresholds, and associated test screens for detecting the new failure thresholds, for the set of ASIC devices. This process includes occasionally, periodically, or at any interval, updating filter DB 80 to reflect new failure thresholds and test screens for ASIC devices. These ASIC devices may be distinct from the devices requested by customer (according to ASIC design data 60).

As shown in FIG. 1, according to various embodiments, processes P2-P4 (along with processes P5-P7 in some cases) can be repeated after the filter DB 80 is updated in process P7. That is, ASIC design data 60 can be processed according to updated filter DB 80 to enhance analysis of the design of ASIC 4.

It is understood that in the flow diagrams shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

FIG. 2 shows an illustrative environment 101 including ASIC analysis system 28, for performing the functions described herein according to various embodiments of the invention. To this extent, the environment 101 includes a computer system 102 that can perform one or more processes described herein in order to analyze an application specific integrated circuit (e.g., ASIC design data 60 for forming an ASIC 4). In particular, the computer system 102 is shown as including the ASIC analysis system 28, which makes computer system 102 operable to analyze an ASIC (e.g., ASIC design data 60 for forming an ASIC 4) by performing any/all of the processes described herein and implementing any/all of the embodiments described herein.

The computer system 102 is shown including a computing device 26, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the ASIC analysis system 28, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human and/or computerized user) 112 to interact with the computer system 102 and/or one or more communications devices to enable the system user 112 to communicate with the computer system 102 using any type of communications link. To this extent, the ASIC analysis system 28 can manage a set of interfaces (e.g., graphical user interface(s), application program interface, etc.) that enable human and/or system users 112 to interact with the ASIC analysis system 28. Further, the ASIC analysis system 28 can manage (e.g., store, retrieve, create, manipulate, organize, present, etc.) data, such as ASIC design data 60 using any solution, e.g., via wireless and/or hardwired means.

In any event, the computer system 102 can comprise one or more general purpose computing articles of manufacture (e.g., computing devices) capable of executing program code, such as the ASIC analysis system 28, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the ASIC analysis system 28 can be embodied as any combination of system software and/or application software. It is further understood that the ASIC analysis system 28 can be implemented in a cloud-based computing environment, where one or more processes are performed at distinct computing devices (e.g., a plurality of computing devices 26), where one or more of those distinct computing devices may contain only some of the components shown and described with respect to the computing device 26 of FIG. 2.

Further, the ASIC analysis system 28 can be implemented using a set of modules 132. In this case, a module 132 can enable the computer system 102 to perform a set of tasks used by the ASIC analysis system 28, and can be separately developed and/or implemented apart from other portions of the ASIC analysis system 28. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of ASIC analysis system 28 fixed thereon (e.g., one or more modules 132). However, it is understood that the computer system 102 and ASIC analysis system 28 are only representative of various possible equivalent computer systems that may perform a process described herein. To this extent, in other embodiments, the functionality provided by the computer system 102 and ASIC analysis system 28 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices 26, the computing devices can communicate over any type of communications link. Further, while performing a process described herein, the computer system 102 can communicate with one or more other computer systems using any type of communications link. In either case, the communications link can comprise any combination of various types of wired and/or wireless links;

comprise any combination of one or more types of networks; and/or utilize any combination of various types of transmission techniques and protocols.

While shown and described herein as methods, systems and computer program products for analyzing an ASIC (e.g., ASIC design data 60 for forming an ASIC 4), it is understood that aspects of the invention further provide various alternative embodiments. For example, in one embodiment, the invention provides a computer program fixed in at least one computer-readable medium, which when executed, enables a computer system to analyze an ASIC (e.g., ASIC design data 60 for forming an ASIC 4). To this extent, the computer-readable medium includes program code, such as the ASIC analysis system 28 (FIG. 2), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the ASIC analysis system 28 (FIG. 2), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of analyzing an ASIC (e.g., ASIC design data 60 for forming an ASIC 4). In this case, a computer system, such as the computer system 102 (FIG. 2), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the invention, including, e.g., the ASIC analysis system 28, is to analyze an ASIC (e.g., ASIC design data 60 for forming an ASIC 4). It is understood that according to various embodiments, the ASIC analysis system 28 could be implemented to analyze a plurality of ICs (e.g., ASIC design data 60 for forming one or more ASICs), as described herein. As described herein, ASIC analysis system 28 can help to enhance the reliability of manufacturing ASIC devices when compared with conventional systems and approaches. In addition to parameters described herein ASIC analysis system 28 may also consider parameters such as activity factor, power-on hours and/or tolerance for defects (e.g., if there is a functional redundancy) in analyzing one or more customer designs.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A system comprising:
at least one computing device configured to analyze a customer design for an application specific integrated circuit (ASIC) by performing actions including:
determining performance requirements of the customer design;
querying a test screen database for the performance requirements of the customer design, the test screen database having failure thresholds and associated test screens for detecting the failure thresholds for a set of ASIC devices;
generating a filter database including select failure thresholds and associated test screens for the performance requirements of the customer design; and
selecting a set of test screens from the filter database based upon a yield cost criteria in forming the ASIC.
2. The system of claim 1, wherein the at least one computing device is further configured to:
compile the set of test screens in an ordered test screen process.
3. The system of claim 2, wherein the at least one computing device is further configured to:
apply the ordered test screen process to the customer design for the ASIC.
4. The system of claim 3, wherein the at least one computing device is further configured to:

refresh the test screen database based upon new failure thresholds and associated test screens for detecting the new failure thresholds for the set of ASIC devices.

5. The system of claim 4, wherein the at least one computing device is further configured to:
query the refreshed test screen database for the performance requirements of the customer design after refreshing the test screen database;
generate a refined filter database including select failure thresholds and associated test screens for the performance requirements of the customer design based upon the refreshed test screen database; and
select a set of test screens from the refined filter database based upon the yield cost criteria in forming the ASIC and a cost of performing each test screen of the set of test screens.

6. The system of claim 1, wherein the performance requirements of the customer design include at least one of a processing speed of the ASIC, a voltage of the ASIC or an operating temperature of the ASIC.

7. The system of claim 1, wherein the failure thresholds indicate an acceptable percentage of ASIC devices formed according to the customer design which will fail due to a time zero failure or an operating life failure.

8. A computer program product comprising program code stored on a non-transitory computer-readable medium, which when executed by at least one computing device, causes the at least one computing device to analyze a customer design for an application specific integrated circuit (ASIC) by performing actions including:
determining performance requirements of the customer design;
querying a test screen database for the performance requirements of the customer design, the test screen database having failure thresholds and associated test screens for detecting the failure thresholds for a set of ASIC devices;
generating a filter database including select failure thresholds and associated test screens for the performance requirements of the customer design; and
selecting a set of test screens from the filter database based upon a yield cost criteria in forming the ASIC.

9. The computer program product of claim 8, wherein the program code further causes the at least one computing device to:
compile the set of test screens in an ordered test screen process.

10. The computer program product of claim 9, wherein the program code further causes the at least one computing device to:
apply the ordered test screen process to the customer design for the ASIC.

11. The computer program product of claim 10, wherein the program code further causes the at least one computing device to:
refresh the test screen database based upon new failure thresholds and associated test screens for detecting the new failure thresholds for the set of ASIC devices.

12. The computer program product of claim 11, wherein the program code further causes the at least one computing device to:
query the refreshed test screen database for the performance requirements of the customer design after refreshing the test screen database;
generate a refined filter database including select failure thresholds and associated test screens for the performance requirements of the customer design based upon the refreshed test screen database; and
select a set of test screens from the refined filter database based upon the yield cost criteria in forming the ASIC and a cost of performing each test screen of the set of test screens.

13. The computer program product of claim 8, wherein the performance requirements of the customer design include at least one of a processing speed of the ASIC, a voltage of the ASIC or an operating temperature of the ASIC.

14. The computer program product of claim 8, wherein the failure thresholds indicate an acceptable percentage of ASIC devices formed according to the customer design which will fail due to a time zero failure or an operating life failure.

15. A computer-implemented method of analyzing a customer design for an application specific integrated circuit (ASIC), performed on at least one computing device, the method comprising:
determining performance requirements of the customer design;
querying a test screen database for the performance requirements of the customer design, the test screen database having failure thresholds and associated test screens for detecting the failure thresholds for a set of ASIC devices;
generating a filter database including select failure thresholds and associated test screens for the performance requirements of the customer design; and
selecting a set of test screens from the filter database based upon a yield cost criteria in forming the ASIC.

16. The computer-implemented method of claim 15, further comprising:
compiling the set of test screens in an ordered test screen process.

17. The computer-implemented method of claim 16, further comprising:
applying the ordered test screen process to the customer design for the ASIC.

18. The computer-implemented method of claim 17, further comprising:
refreshing the test screen database based upon new failure thresholds and associated test screens for detecting the new failure thresholds for the set of ASIC devices.

19. The computer-implemented method of claim 18, the method further comprising:
querying the refreshed test screen database for the performance requirements of the customer design after refreshing the test screen database;
generating a refined filter database including select failure thresholds and associated test screens for the performance requirements of the customer design based upon the refreshed test screen database; and
selecting a set of test screens from the refined filter database based upon the yield cost criteria in forming the ASIC and a cost of performing each test screen of the set of test screens.

20. The computer-implemented method of claim 15, wherein the performance requirements of the customer design include at least one of a processing speed of the ASIC, a voltage of the ASIC or an operating temperature of the ASIC, and wherein the failure thresholds indicate an acceptable percentage of ASIC devices formed according to the customer design which will fail due to a time zero failure or an operating life failure.

* * * * *